US012403688B2

(12) United States Patent
Nehring et al.

(10) Patent No.: US 12,403,688 B2
(45) Date of Patent: Sep. 2, 2025

(54) APPARATUS AND PROCESS FOR T-SHIRT/GARMENT SCREEN PRINTING

(71) Applicant: BLUEBACK, LLC, Carroll, IA (US)

(72) Inventors: Jeff Eugene Nehring, Carroll, IA (US); John August Reglein, Carroll, IA (US); Jeffrey Justin Puffett, Carroll, IA (US)

(73) Assignee: BLUEBACK, LLC, Carroll, IA (US)

( * ) Notice: Subject to any disclaimer, the term of this patent is extended or adjusted under 35 U.S.C. 154(b) by 12 days.

(21) Appl. No.: 18/591,958

(22) Filed: Feb. 29, 2024

(65) Prior Publication Data

US 2024/0198655 A1 Jun. 20, 2024

Related U.S. Application Data

(62) Division of application No. 16/949,184, filed on Oct. 19, 2020, now Pat. No. 11,993,069.

(60) Provisional application No. 62/923,184, filed on Oct. 18, 2019.

(51) Int. Cl.
*B41F 15/36* (2006.01)

(52) U.S. Cl.
CPC .......... *B41F 15/36* (2013.01); *B41P 2215/12* (2013.01)

(58) Field of Classification Search
CPC ...... B41F 15/36; B41F 15/08; B41F 15/0813; B41F 15/14; B41F 15/38; B41F 15/42; B41P 2215/12
See application file for complete search history.

(56) References Cited

U.S. PATENT DOCUMENTS

| | | | | | |
|---|---|---|---|---|---|
| 2,218,451 | A * | 10/1940 | Heyne | B41F 15/36 101/127.1 |
| 5,050,498 | A * | 9/1991 | Smith | B41F 15/08 101/127.1 |
| 5,136,939 | A | 8/1992 | Simmons | |
| 5,297,487 | A | 3/1994 | Simmons | |
| 5,306,376 | A | 4/1994 | James | |
| 5,327,828 | A | 7/1994 | Barocas et al. | |
| 5,379,691 | A * | 1/1995 | Hamu | B41C 1/14 101/127.1 |
| 6,073,554 | A | 6/2000 | Cutcher, Sr. | |
| 6,318,255 | B1 | 11/2001 | Larson | |
| 2014/0174308 | A1 | 6/2014 | Wright et al. | |

FOREIGN PATENT DOCUMENTS

| | | | |
|---|---|---|---|
| WO | WO-8403662 | A1 * | 9/1984 |
| WO | 2006088777 | A2 | 8/2006 |

* cited by examiner

*Primary Examiner* — Christopher E Mahoney
*Assistant Examiner* — Marissa Ferguson-Samreth
(74) *Attorney, Agent, or Firm* — McKee, Voorhees & Sease, PLC

(57) ABSTRACT

A screen assembly is provided for screen printing and includes a screen with a perimeter frame and a tray covering the frame. The tray includes a central opening with an inner peripheral lip or edge which press fits against the screen to keep ink from contacting the frame during the screen printing process. After printing, the tray is removed from the frame so that the assembly can be cleaned and reused. The assembly and its method of use eliminates the need for conventional taping of the screen and frame.

18 Claims, 9 Drawing Sheets

APPARATUS AND PROCESS FOR T-SHIRT/GARMENT SCREEN PRINTING

CROSS REFERENCE TO RELATED APPLICATIONS

This is a Divisional application of U.S. Ser. No. 16/949,184, filed Oct. 19, 2020, which claims priority to Provisional Application U.S. Ser. No. 62/923,184, filed on Oct. 18, 2019, all of which are herein incorporated by reference in their entireties.

FIELD OF INVENTION

A tray is provided for use with a screen printing frame to eliminate the need to tape the frame, and to simplify clean up after printing. A screen printing method is provided which mounts the tray to the frame without the use of tape, thereby reducing time and costs for a printing project.

BACKGROUND OF THE INVENTION

Screen printing of T-shirts, garments, and other fabrics and materials is well known and widely used. For this printing process, ink is forced through a screen having perforations defining the image to be printed. The remainder of the screen, except for the edges, is coated or covered with emulsion which prevents ink from passing through. The screen is mounted in a frame. The emulsion typically does not extend to the frame. Prior to application of the ink, the juncture of the screen and the frame is normally taped to keep ink from passing through the openings along the edges of the screen adjacent the frame. The tape, such as masking tape, is applied manually, and is removed manually. The taping process is time consuming and adds both labor and material costs to the printed products. Thus, the taping increases the price of the product and/or decreases profitability. The application and removal of tape also slows down the printing process.

Therefore, there is a need to improve the conventional screen printing process by eliminating taping of the screens so as to reduce costs and increase profits.

Accordingly, a primary objective of the present invention is the provision of a reusable plastic tray, in place of conventional tape, on a screen print frame.

Another objective of the present invention is the provision of a one-piece protective tray removably mounted on a screen print frame to prevent ink from entering the crack between the frame and the outside edge of the screen that is not covered in emulsion.

Yet another objective of the present invention is the provision of a protective tray which quickly and easily fits onto a screen printing frame to eliminate the use of tape on the screen and frame.

Still another objective of the present invention is the provision of a screen printing method with does not involve manual application and removal of tape to the screen and frame.

A further objective of the present invention is the provision of a method of preparing a screen assembly for screen printing using a tray overlay on the frame, and without using tape on the perimeter edge of the screen.

Another objective of the present invention is the provision of a screen printing method which reduces the printing time and costs.

These and other objectives will become apparent from the following description of the invention.

SUMMARY OF THE INVENTION

A screen assembly is provided for screen printing of T-shirts, and the like. The assembly includes a screen mounted to a frame, and a tray removably mounted to the frame. The tray may be mounted to the frame with a snap fit, or alternatively, by the use of fasteners. The frame and tray have matching profiles or contours so as to provide a mating fit. The tray includes an inner flange or lip which overlies and contacts a perimeter edge of the screen. The tray prevents ink from leaking or migrating to the frame. The tray eliminates use of masking tape, as normally used in the screen printing industry, and thus saves printing time and costs.

The screen printing method of the present invention includes the steps of mounting a tray over the frame so as to cover the frame and a perimeter edge of the screen. Then ink can be forced through the screen onto the substrate. After inking, the tray is removed from the frame, such that the screen, frame and tray can be cleaned for subsequent use. The method eliminates the need for masking tape, thereby reducing printing time and costs.

DETAILED DESCRIPTION OF THE PREFERRED EMBODIMENTS

Figure 1:
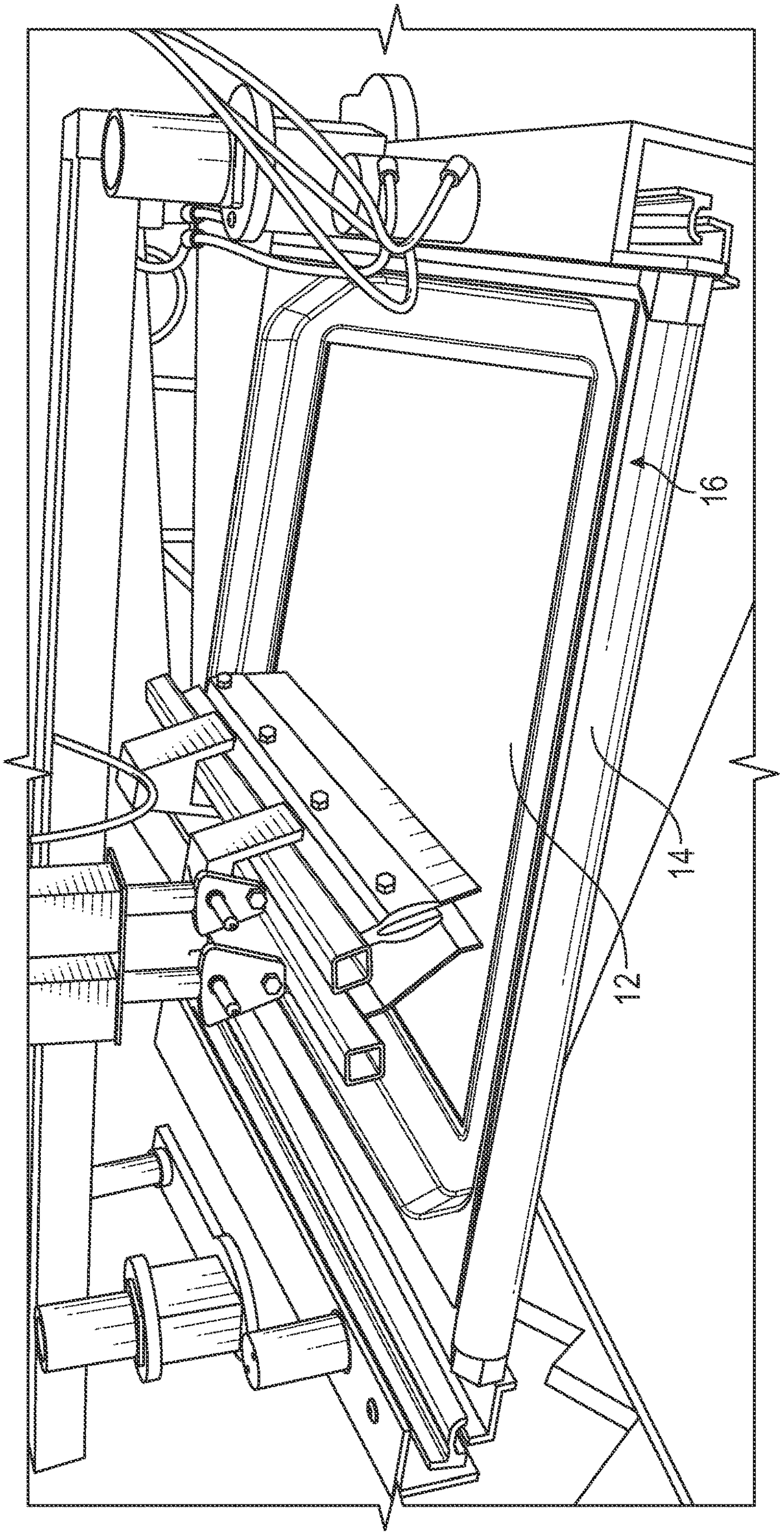
FIG. 1 is a perspective view showing a screen printing machine with a screen assembly mounted therein, including a frame and the tray of the present invention, and ready to receive ink for printing.
Figure 2:
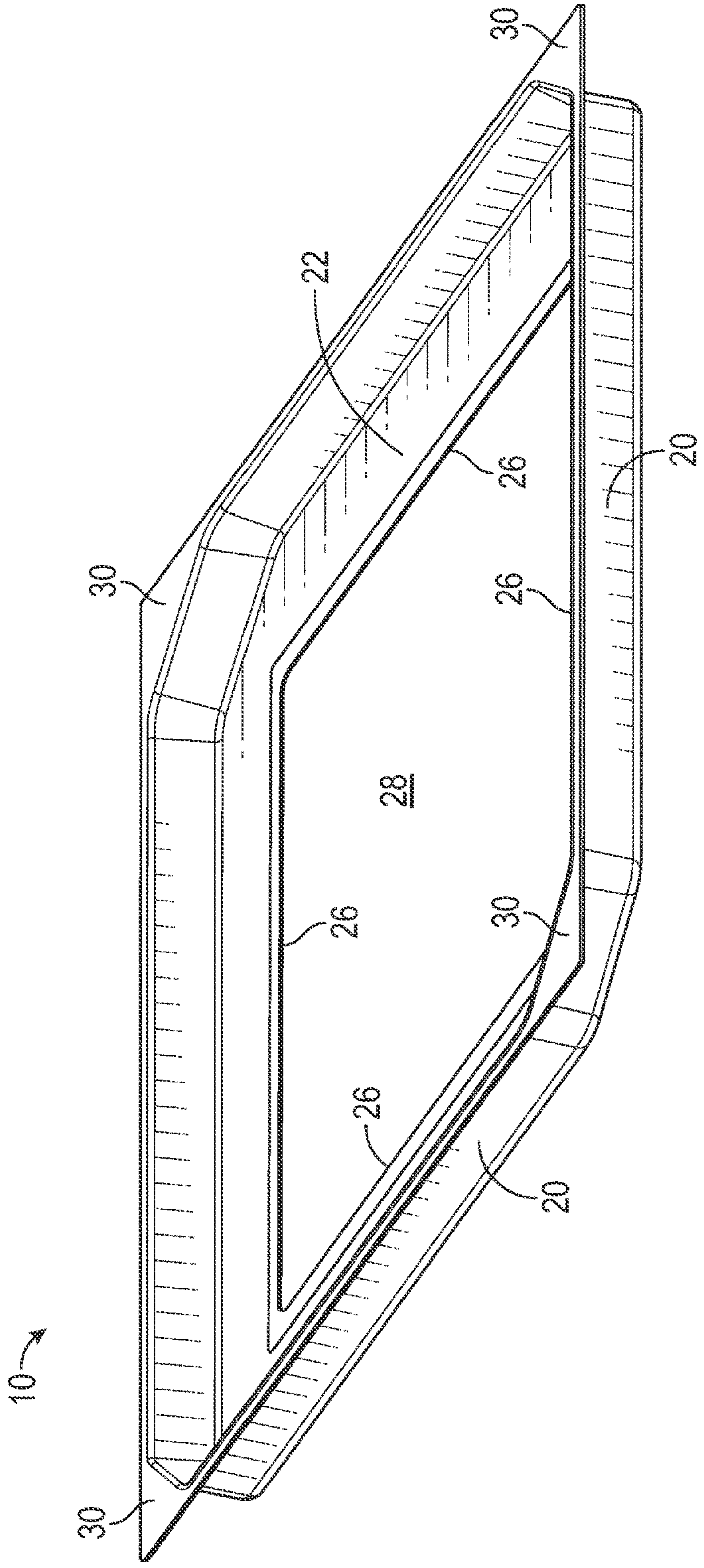
FIG. 2 is a bottom perspective view of one embodiment of the screen printing tray for use on one exemplary type of framed screen, according to the present invention.
Figure 3:
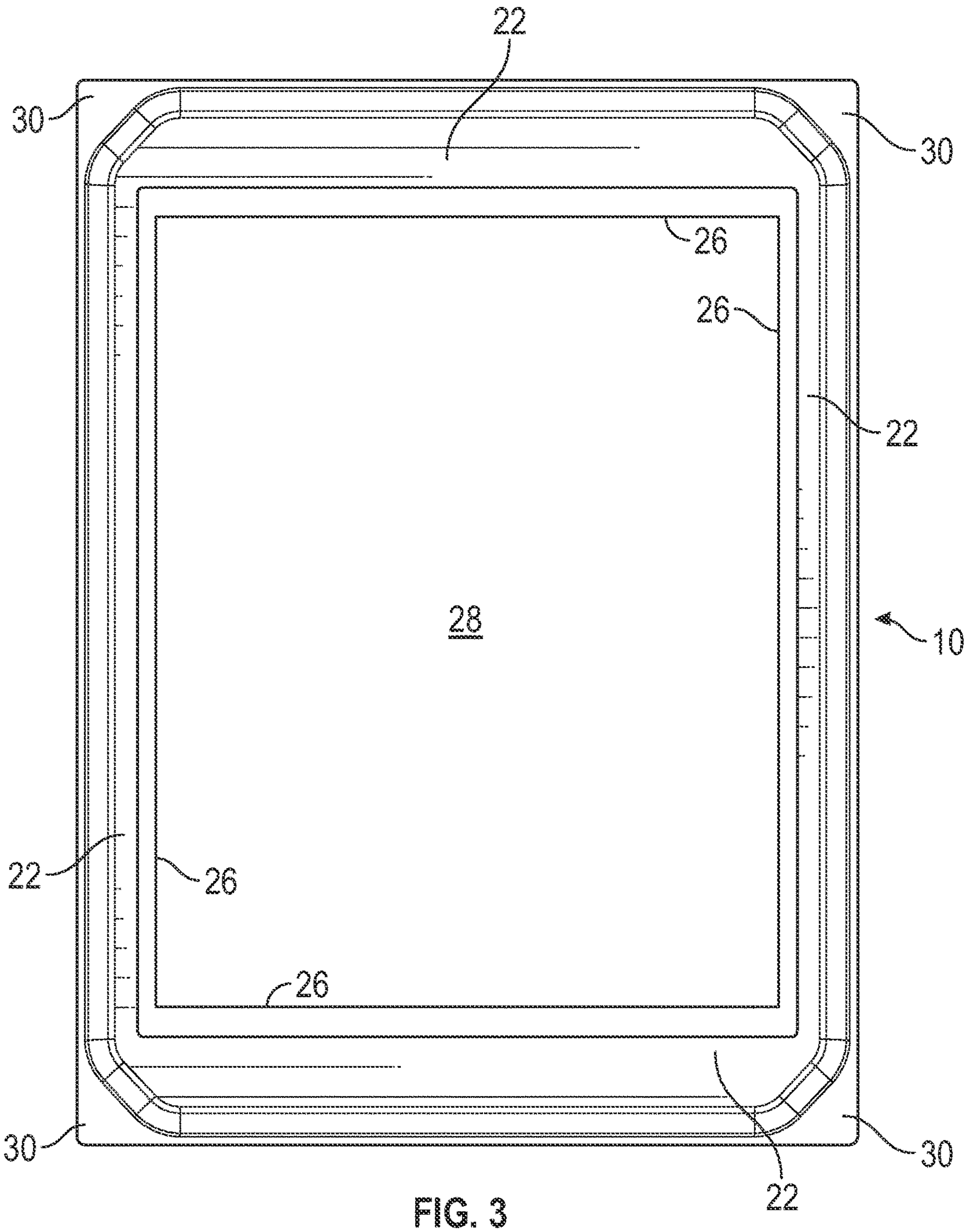
FIG. 3 is a bottom plan view of the tray shown in FIG. 2.
Figure 4:
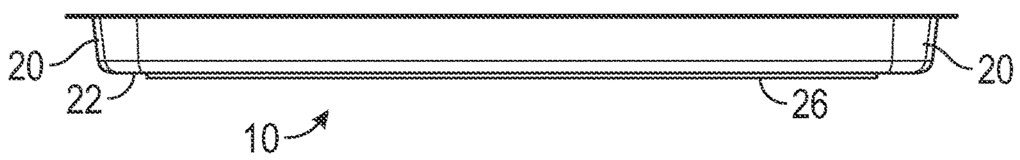
FIG. 4 is an end elevation view of the tray shown in FIG. 2.
Figure 5:
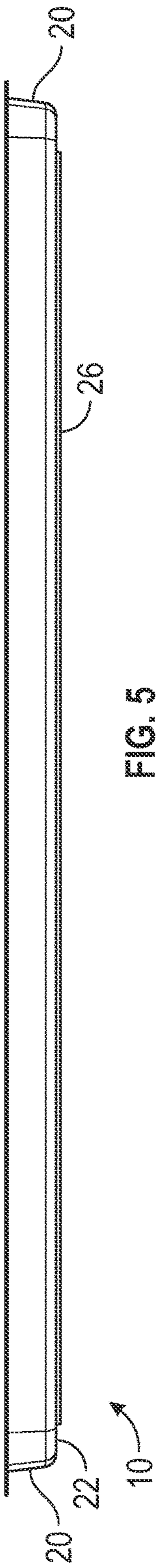
FIG. 5 is a side elevation view of the tray shown in FIG. 2.
Figure 6:
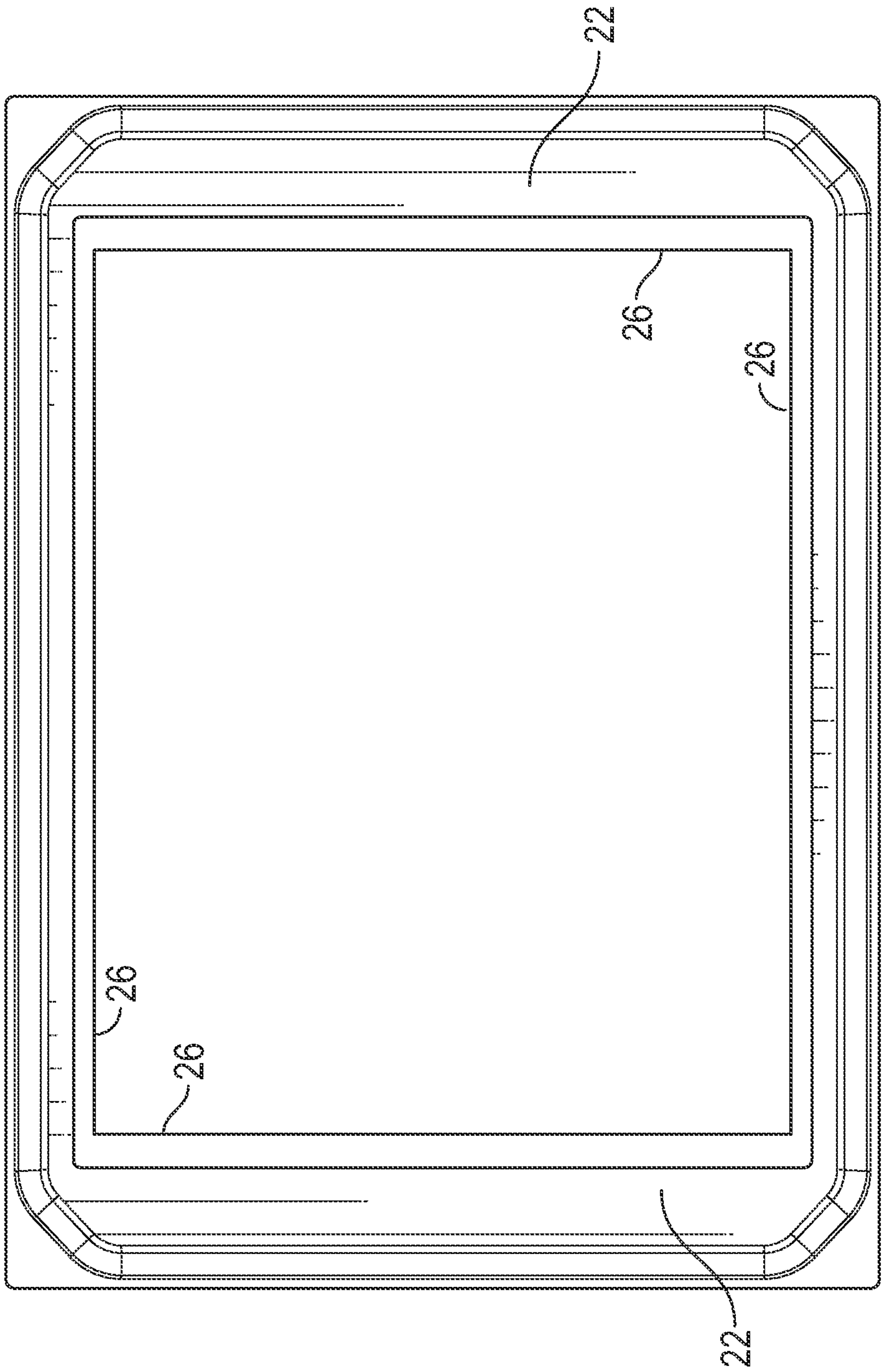
FIG. 6 is a top plan view of the tray.
Figure 7:
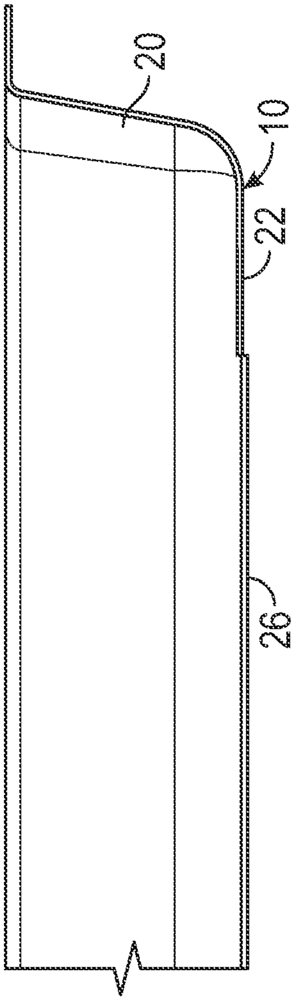
FIG. 7 is an enlarged view of one corner of the tray.
Figure 8:
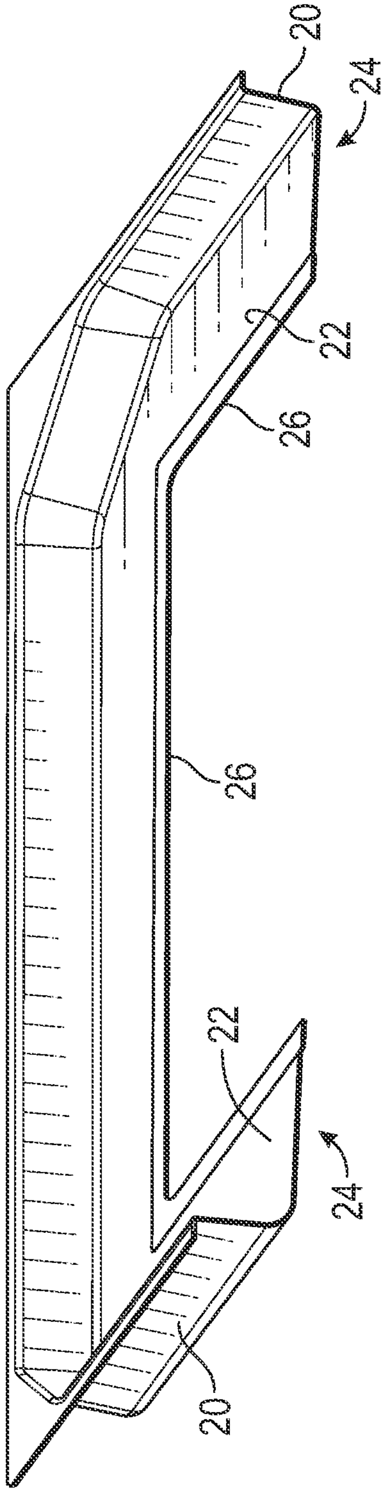
FIG. 8 is a sectional view showing the profile of the tray.
Figure 9:
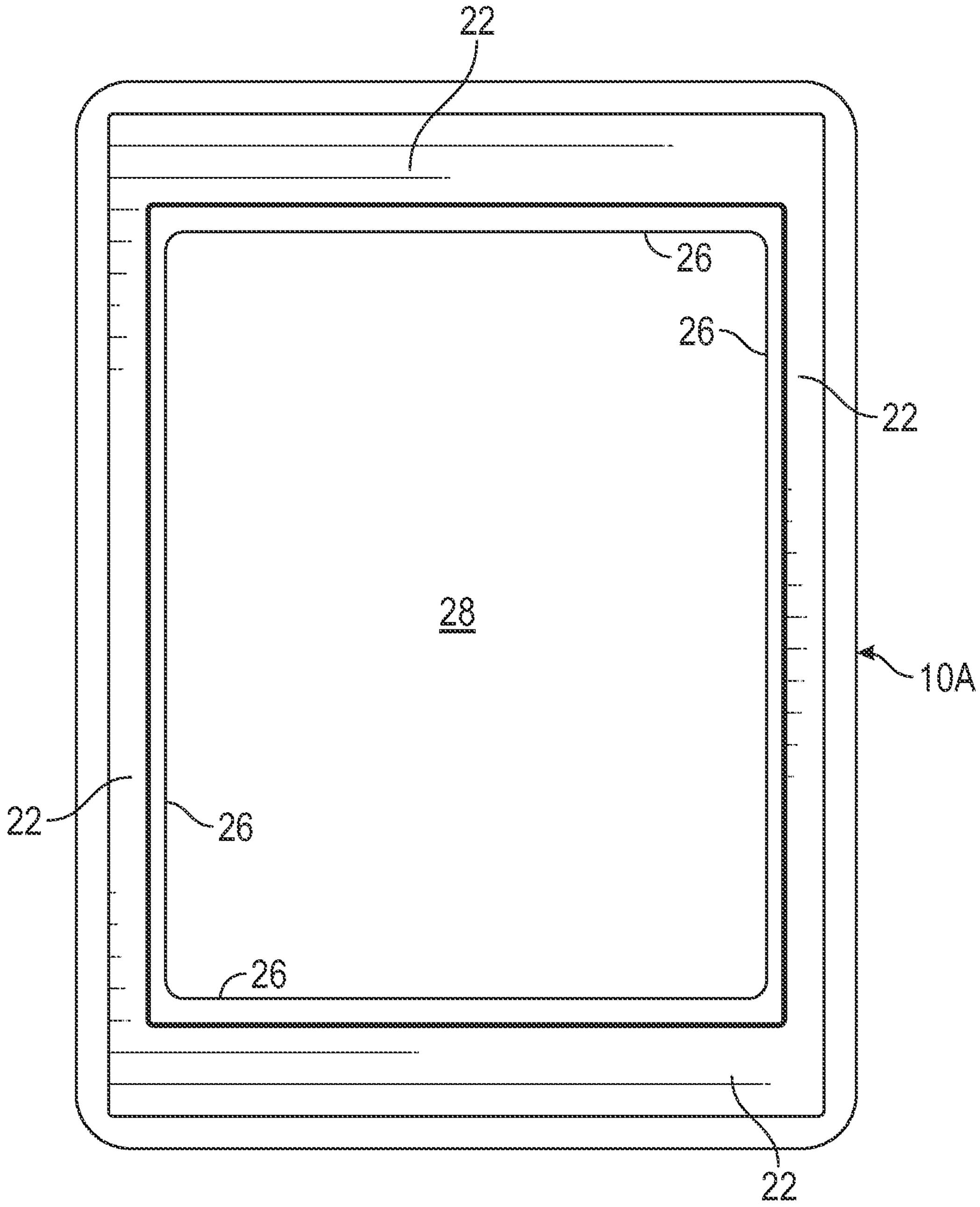
FIG. 9 is a front elevation view of a second embodiment of the tray, according to the present invention.
Figure 10:
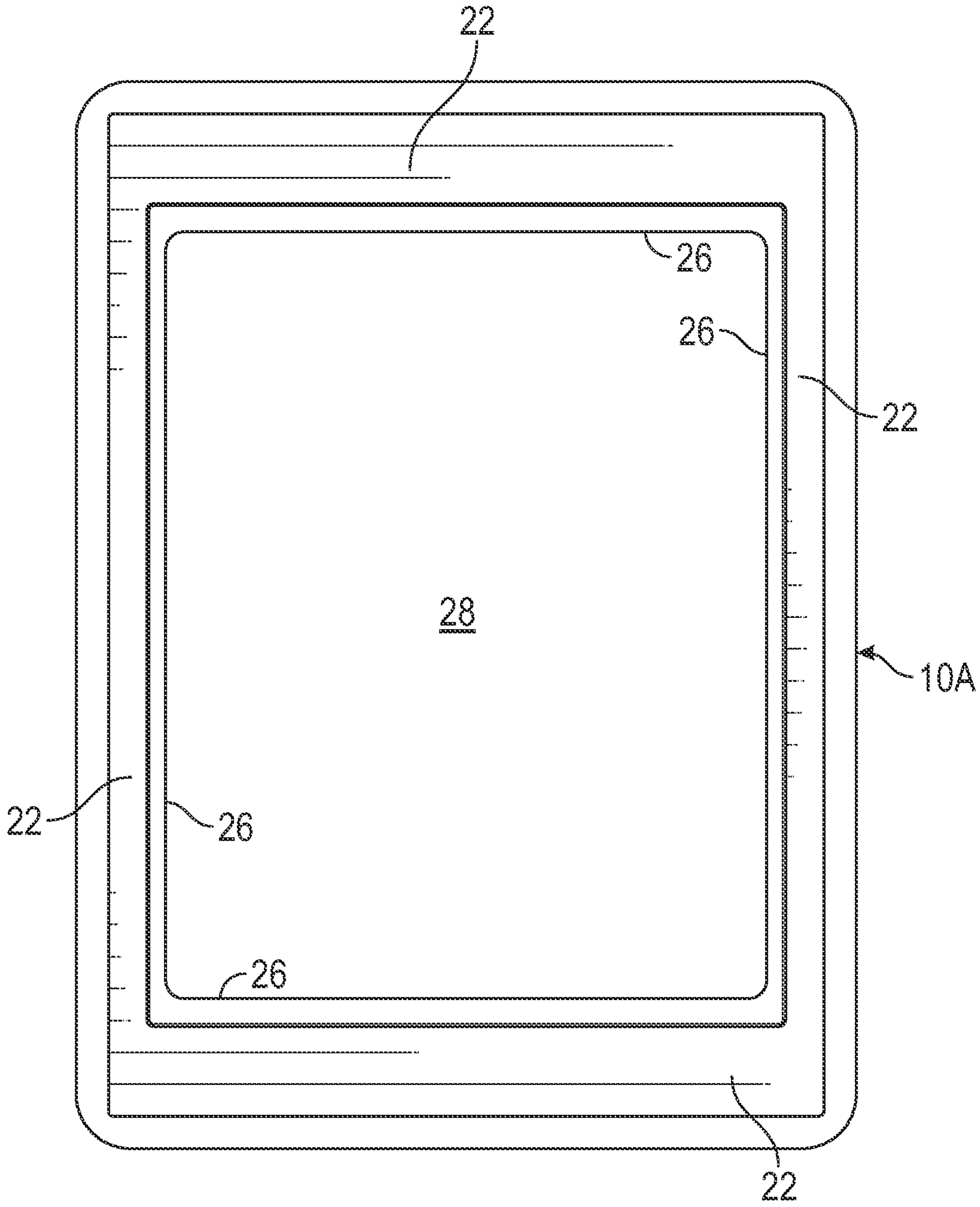
FIG. 10 is a rear elevation view of the second embodiment tray.
Figure 11:
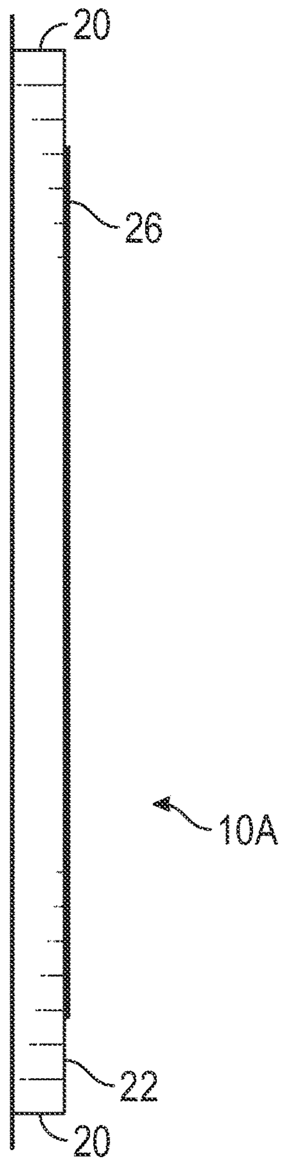
FIG. 11 is a side elevation view of the second embodiment tray.
Figure 12:
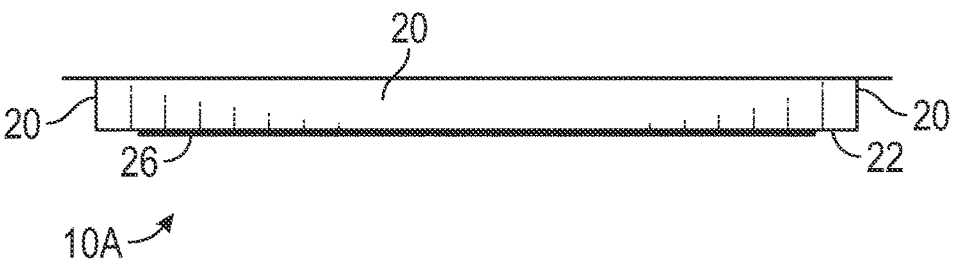
FIG. 12 is a top plan view of the second embodiment tray.

A reusable tray 10 is designed for use in screen printing as a substitute for taping the screen and frame juncture. The inside perimeter edge of the screen 12 and the frame 14 is covered by the tray 10 to prevent ink from entering the juncture or crack between the screen 12 and the frame 14, where there is no emulsion on the screen. With the tray 10 mounted on the frame 14, the screen assembly 16 can be used for both an automatic machine and manual screen printing processes.

The screen 12 and the frame 14 are conventional.

The tray 10 has a shape and profile matching the shape and profile of the frame 14. It is understood that the frame may take various shapes and forms, such that the tray also has matching or coordinating shapes and forms to mount on the frame. In the preferred embodiment, the tray 16 is made of a lightweight plastic or composite material which allows the tray 10 to be snap fit onto the frame 14 for quick and easy mounting and removal. Thus, for the rectangular frame 14 shown in the photographs, the tray, has a matching rectangular size and shape. In other embodiments, the tray may be mounted on the frame by other means, such as clips, clamps, snaps, hook and loop materials, and other fasteners which allow quick and easy assembly and disassembly of the tray to and from the frame.

In the first embodiment shown in FIGS. 2-8, the tray 10 has a sidewall 20 and a front wall 22 defining an inside pocket or recess 24 which matches the exterior shape or profile of the frame 14. The front wall 22 of the tray 10 extends inwardly and terminates in a flange or lip 26 which engages the screen 12 when the tray 10 is mounted on the frame 14. The tray 10 has an enlarged central opening 28 to allow ink to be applied to the screen 12. The tray 10 fits onto the frame 14 so that the flange or lip 26 is pressed against the screen 12. The tray contour creates the necessary pressure between the lip 26 and the screen to "seal" the tray to the screen, and thereby prevent leakage of ink to the frame 14 at the screen edges, without the use of tape. The corners 30 of the tray 10 may extend beyond the corners of the frame 14 so that a user can grip the tray 10 for mounting and removal to and from the frame 14 to define tabs.

The screen assembly 16 can be used in an automatic screen printing machine, such as shown in FIG. 1, or can be used for manual screen printing. After the shirts, garments, or other objects have been printed, the assembly 16 can be removed from the machine. Then, the tray 10 can be quickly and easily removed from the frame 14. The interior flange or lip 26 maintains the outer perimeter of the screen 12 in a clean condition without ink getting to the frame 14. The screen 12 can then be rinsed and cleaned for future use.

The tray 10 eliminates the need to apply tape before the printing process and eliminates removal of tape after the printing process. The tray 10 can be easily cleaned for use in subsequent printing operations. Thus, the tray 10 saves significant time and costs.

A second embodiment of a tray 10A is shown in FIGS. 9-12. The tray 10A is substantially similar to the tray 10 shown in FIGS. 2-8, except of the shape of the tray corners. The tray 10 has a slightly curved profile for the edge or sidewall 20, while the tray 10A has a square profile for the sidewall 20A. The trays 10 and 10A will fit the most common frames used in the screen printing industry, one of which has a curved or rounded profile and the other of which has a square profile.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of screen printing using a screen with an upstanding perimeter frame, comprising:

snapping a tray downwardly over the frame onto a top surface of the screen so as to cover the frame and a perimeter edge portion of the screen; then applying ink through the screen to a substrate; then removing the tray from the frame; then cleaning the screen, frame and tray for subsequent screen printing; and whereby the snap fit of the tray onto the frame creates a seal against the screen to preclude ink leakage.

2. The method of claim 1 wherein the ink is applied without the use of tape on the frame and screen.

3. The method of claim 1 wherein snapping the tray over the frame matingly engages the tray and frame.

4. The method of claim 1 further comprising matingly engaging a vertical perimeter surface of the tray with a vertical perimeter surface of the frame.

5. The method of claim 1 wherein the snapping of the tray over the frame creates a pressure fit of the tray against the screen.

6. The method of claim 1 wherein the tray has a central opening with an inner peripheral edge, and the method further comprising press fitting the inner peripheral edge of the tray against the screen to prevent ink from migrating to the frame.

7. The method of claim 1 further comprising retaining the tray on the frame without use of mechanical fasteners.

8. The method of claim 1 further comprising removing the tray from the frame by pulling on tabs on the tray.

9. A method of assembling a screen and tray for ink screen printing, comprising:

inserting the tray on top of the screen and inside an upwardly extending frame on the screen, whereby a surface of the tray mating engages a surface of the frame to provide a snap connection between the tray and the frame and creates a sealing engagement of the tray with the screen to prevent ink leakage under the tray.

10. The method of claim 9 further comprising retaining the tray in the frame without use of mechanical fasteners.

11. The method of claim 9 wherein the sealing engagement between the tray and the screen is free of tape during printing.

12. The method of claim 9 further comprising disassembling the tray and the screen for cleaning and reuse for subsequent printing.

13. The method of claim 9 further comprising pulling upwardly on tabs on the tray to disengage the tray from the frame.

14. A method of preparing a screen for screen printing, comprising:

pushing a tray with a central opening downwardly into a frame extending upwardly from the screen such that a horizontal lip on the tray sealingly contacts an upper surface of the screen; and the tray and the frame having mating vertical surfaces to provide a snap fit between the tray and the frame to create the sealing contact which prevents ink leakage under the tray.

15. The method of claim 14 wherein use of tape on the tray and screen is avoided after the snap fitting of the tray and the frame.

16. The method of claim 14 wherein use of mechanical fasteners is avoided after the snap fitting of the tray and the frame.

17. The method of claim 14 further comprising separating the tray from the frame by pulling on tabs on the tray in a direction away from the frame to overcome the snap fit.

18. The method of claim 14 wherein the tray is removeable from the frame, such that the tray, the frame and the screen are cleanable for reuse.

* * * * *